June 10, 1969     J. D. BROOKS     3,448,714
FIN AND REVOLVING CYLINDER BIDIRECTIONAL STEERING ACTUATOR
Filed Jan. 22, 1968     Sheet 1 of 2
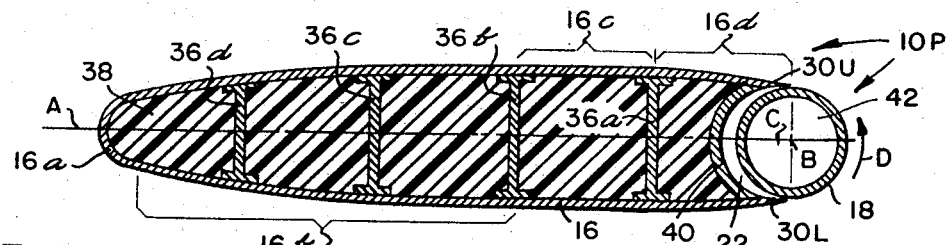
FIG. 2.
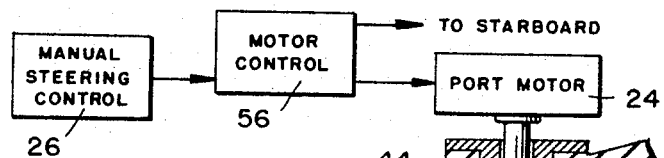
FIG. 1.
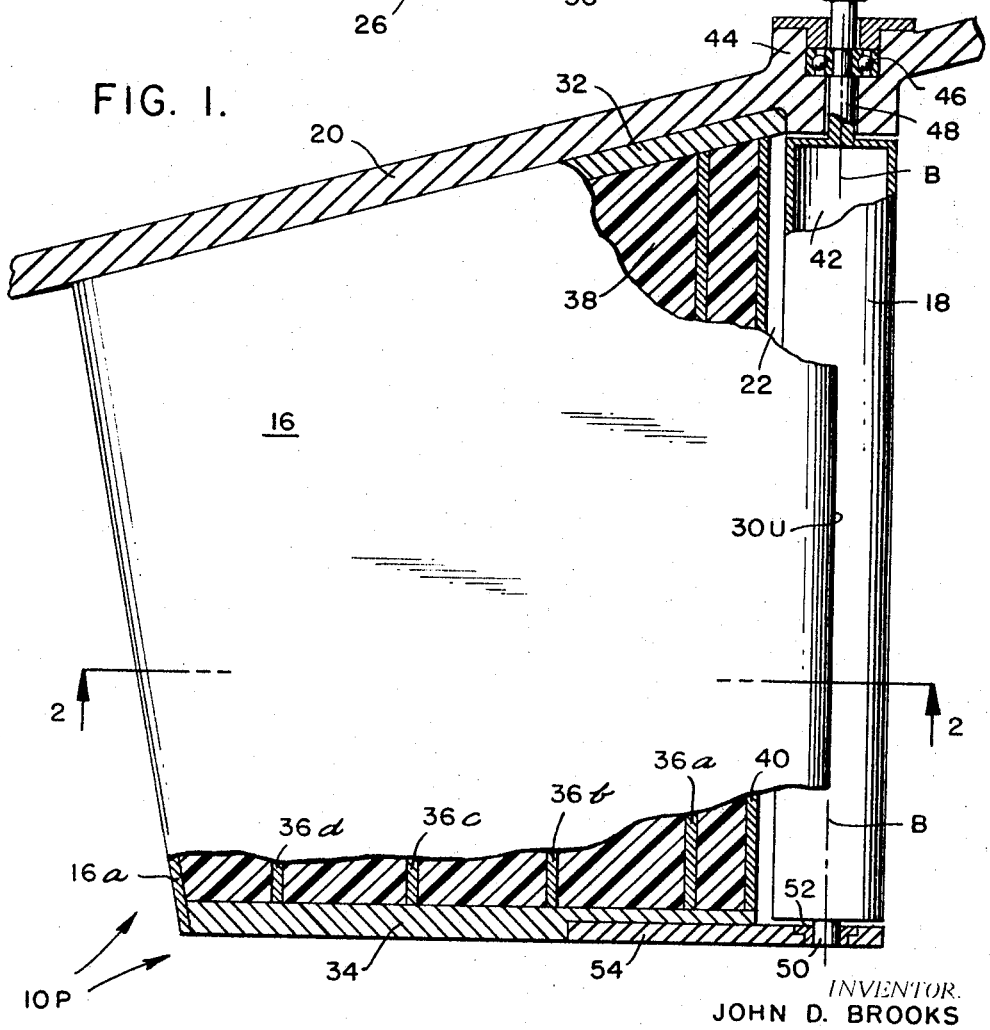
INVENTOR.
JOHN D. BROOKS
BY
MICHAEL F. OGLO
ROY MILLER
ATTORNEYS.

United States Patent Office 3,448,714
Patented June 10, 1969

3,448,714
FIN AND REVOLVING CYLINDER BIDIRECTIONAL STEERING ACTUATOR
John D. Brooks, San Gabriel, Calif., assignor to the United States of America as represented by the Secretary of the Navy
Filed Jan. 22, 1968, Ser. No. 699,723
Int. Cl. B63h 25/40
U.S. Cl. 114—162                                    5 Claims

ABSTRACT OF THE DISCLOSURE

A neutral lift fin has a semi-circular recess formed in its trailing edge. A cylindrical rotor is mounted for rotation with one-half of its cross section in the recess. The opposite fin surfaces are faired into the outer periphery of the rotor and merged with the recess to form knife edges in intimately close tangential relationship to the surface of the rotor. The rotor is driven by a selectively reversible motor to provide bi-directional steering or lift control.

Background of invention

This invention relates to steering and hydrodynamic lift control actuators for water craft, and more particularly to a novel actuator of special utility in providing positively controlled steering and/or lift forces for deep submergence submarines while traveling in the approximate speed range of 2–10 knots.

The prior art methods of providing steering and hydrodynamic lift control for deep submergence submarines were of two basic types. Very slow vehicles of the 1–4 knot class, such as the *Trieste, Alvin,* etc., used vertical and horizontal thrusters for maneuvering. This is necessary because at very low speeds the hydrodynamic control forces that might be available with rudders and elevators are negligible compared to the inertia forces of the vehicle. Relatively high speed craft, on the other hand, such as the *Dolphin* use cruciform fins with deflectible fin and rudder tabs, and as a result experience difficulty in their low range of speed.

Accordingly an object of the invention is to provide a hydrodynamic steering and lift control actuator capable of positive control of lift and steering forces with a high degree of control resolution.

Another object is to provide a steering and lift control actuator in accordance with the preceding objective which is of special utility in connection with deep submergence submarines which may have to operate in the speed range of 2–10 knots.

Other objects and many of the attendant advantages of this invention will be readily appreciated as it becomes better understood by reference to the description and accompanying drawing which follows.

Brief description of drawings

FIG. 1 is an enlarged top elevation of an elevator unit for a deep submergence submarine taken in the direction of arrow 1, FIG. 3;

FIG. 2 is a section taken along lines 2—2, FIG. 1;

Detailed description of preferred embodiment

Figure 3:
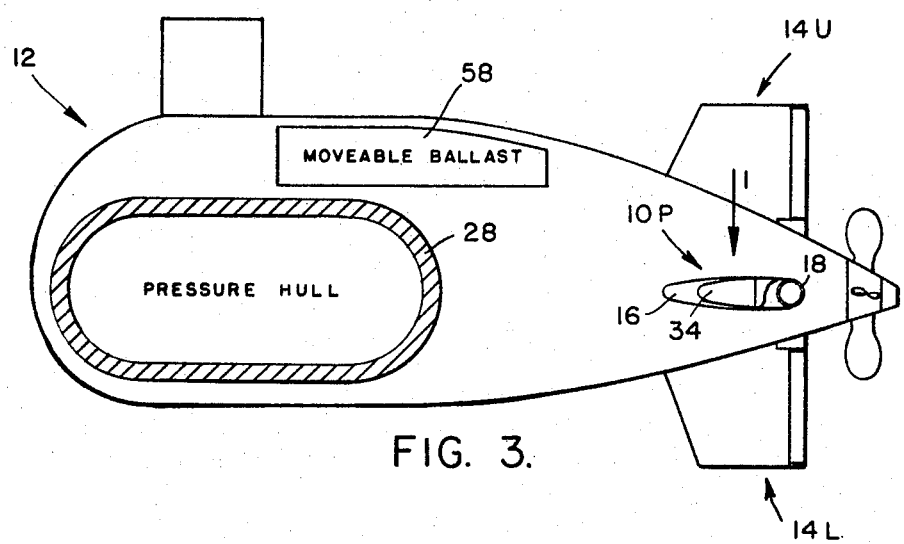
FIG. 3 is a diagrammatic view of a deep submergence submarine employing the present invention.

Referring now to the drawing, and in particular to FIGS. 1 through 3, a fin and revolving cylinder unit 10P is appended at the port side of the tail cone of a deep submergence submarine 12. Another fin and revolving cylinder unit (not shown) is appended at the starboard side. Together the two constitute the submarine elevator control actuators, as well as forming part of the stabilization fin arrangement. Similar fin and cylinder units 14U and 14L are appended to the upper and lower side of the tail cone and comprise the submarine rudder control actuators. All the fin and cylinder units are basically alike, so that the description of the port side unit 10P is exemplary of all. Unit 10P comprises a fixed hydrofoil or fin element 16 and a rotor element 18. Fin 14 is attached to the outer hull 20 of submarine 12, and rotor 18 is journaled for rotation in a semi-circular recess 22 in the trailing edge of the hydrofoil. A reversible, variable speed motor 24 within hull 20 is drivingly connected to rotor 18. The motor is in turn controlled by the manual elevator controls 26 manipulated by personnel in the submarine's pressure hull 28.

Fin 16 is a fixed stabilization hydrofoil having a zero angle of attack. It has a hydrofoil section which is symmetric about a reference plane A extending spanwise through the hydrofoil. The shape of the hydrofoil section consists of a rounded nose section 16a which is faired into a streamline tapered section 16b, which in turn expands and joins a midsection 16c of uniform chord thickness. Aft of midsection 16c, an ogival section 16d is faired into the circular cross section of rotor 18. The trailing end of the hydrofoil forms knife edges 30U, 30L where the upper and lower hydrofoil surfaces merge with recess 22. The trailing end has a chordal thickness (measured between the tips of knife edges 30U, 30L) which is three-quarters of the hydrofoil section maximum thickness along section 16c. Fin 16 is constructed of an inboard former 32 affixed to hull 20, an outboard former 34 and spanwise extending spars 36a, 36b, 36c, and 36d. The interior is filled with buoyancy epoxy and micro sphere material 38. One satisfactory material is disclosed in the copending application, S.N. 300,395, filed Aug. 6, 1963, by Ray F. Hinton. This material has a high compressive strength and a modulus resulting in small volume change under compression experienced at depths of operation of submarine 12. A panel 40 shaped into a semi-circular curve forms the semi-circular recess 22 at the trailing edge of the hydrofoil.

Rotor 18 has a hollow interior 42. This is left empty to reduce the amount of power required to drive the rotor. A boss 44 containing a roller bearing assembly 46 is formed on the submarine hull 12. An extended drive shaft 48 is formed on the inboard side of the rotor and projects through the bore of the boss into the interior of the submarine. The end of shaft 48 is driven by motor 24. The space in which the motor is mounted is flooded and the motor 24 is of the brushless type which can operate immersed. A short rotation shaft 50 projects from the outboard side of the rotor and is journaled in a bearing 52 carried in a plate 54 affixed to outboard former 34.

The axis of rotation B of rotor 18 passes through shafts 48 and 50. As may be seen in FIG. 2, axis B is slightly aft of the center C of the semi-circular recess 22. The knife edges extend rearwardly to a point in alignment with axis A, and rotor 18 is made with a diameter substantially equal to the chordal thickness separating the edges 30U, 30L. Only such clearance as needed to permit the rotor to revolve is left. This construction results in the knife edges 30U, 30L being intimately close to the circumference of the rotor 18. The gap between the rotor and semi-circular panel 40 increases toward the bottom of recess 22, forming a maximum gap at the bottom. The purpose of this non-uniform gap is to reduce fluid friction between the rotor and recess. The intimacy between the knife edges and the rotor surface permit the induced motion of the boundary layer adjacent the exposed portion of the rotor to influence the movement of water adjacent the upper and lower hydrofoil surfaces.

Vertical steering of the submarine is controlled by control of rotation of the rotors of port fin and revolving cylinder unit 10P and of the counterpart unit on the starboard side. The rotors are electrically ganged together by the motor control 56 intermediate the manual control 26 and the two motors. When lift is desired, the rotors are driven in a direction in which the circumferential travel of the exposed portion of the rotor is from the lower knife edge 30L to upper knife edge 30U. For the case of unit 10P this direction is indicated by arrow D in the drawing. The faster the speed of rotation the greater the resultant lift. However, the amount of lift is an inverse function of the stream velocity, so that greater speed of rotation is needed to achieve a given lift force for higher relative stream velocities. It has been found that effective lift forces are obtained when the speed of rotation is such that the tangential velocity of the surface of the motor is equal to the stream velocity, i.e. the tangential velocity to stream velocity ratio is unity. Lift varies approximately linearly for an appreciable range of ratios above and below unity. Driving the rotors in the opposite direction of rotation correspondingly produces negative lift. As is conventional with deep submergence submarines, there is a trim tank arrangement 58 (FIG. 3) to provide longitudinally movable ballast, and this is operated conjunctively with the hydrodynamic controls during maneuvering. From the foregoing it will be appreciated that positive control of hydrodynamic lift with a high degree of control resolution can be achieved through accurate control of the speed and direction of rotation of the rotors. Such positive maneuvering control is particularly needed in the operation of deep submergence submarines in the speed range of 2–10 knots relative speed. These vehicles often operate in underwater currents and near the ocean bottom where any sudden "surges" in the motion of the submarine could be disastrous.

Figure 4:
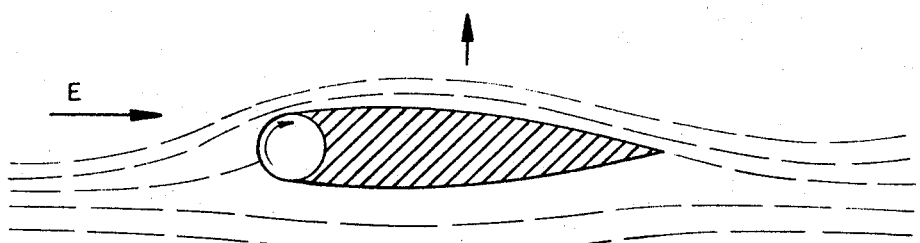
FIG. 4 is a flow field diagram of the operation of a hypothetical construction of fin and revolving cylinder unit in which the revolving cylinder is at the leading edge (*not* in accordance with the present invention)
Figure 5:
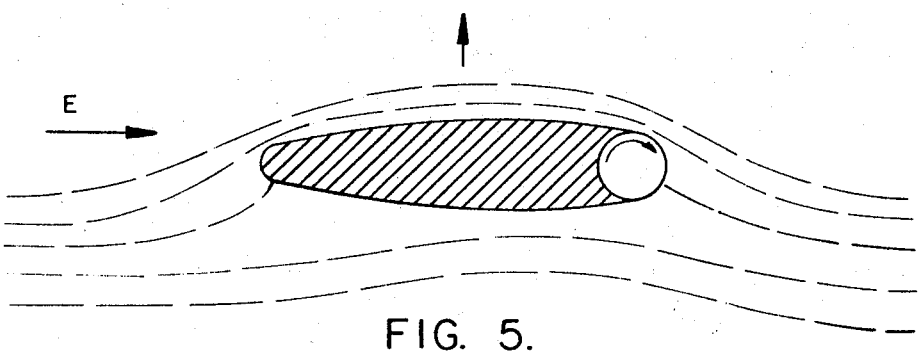
FIG. 5 is a flow field diagram of operation of a fin and revolving cylinder steering and lift control actuator having the revolving cylinder in the trailing edge (*in* accordance with the present invention).

An important feature of the invention is that the rotor is located at the trailing edge of the fin element. It has been found that such an arrangement produces as much as thirty times the lift force that can be produced by locating the revolving rotor in the forward edge. While the cause of this dramatic difference is not fully understood, a tentative explanation will be presently related with reference to FIGS. 4 and 5. FIG. 4 diagrammatically represents a hypothetical fin and revolving cylinder unit having the rotor in the leading edge. FIG. 5 represents the situation of the present invention having the rotor in the trailing edge. Both are assumed to be moving with relative stream velocity in the direction of arrows E.

Referring to FIG. 4, rotation of the cylinder in the leading edge position as shown causes the forward stagnation point to move down. The circulation about the hydrofoil thus produced causes some bending of the trailing edge streamline, but because of the sharp trailing edge there is little change in the character of the flow at this point.

In FIG. 5, on the other hand, rotation of the cylinder at the trailing edge causes both the forward stagnation point and trailing streamlines to move down. Thus for the same rotative speed, much greater circulation and hence much greater lift is obtained for the configuration in FIG. 5 as opposed to that of FIG. 4.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Rotating cylinder hydrofoil apparatus providing the dual function of stabilization and bi-directional steering control, comprising;
    (a) a fixed zero angle of attack, neutral lift, hydrofoil element having a reference plane of symmetry,
    (b) said fixed hydrofoil element having a trailing end having formed therein a spanwise recess having an approximately half circular cross section symmetric about the reference plane,
    (c) a cylindrical rotor having a diameter substantially equal to that of the half circular cross section of the recess and rotatably mounted about a spanwise axis lying in said reference plane with one-half of the rotor disposed in the recess,
    (d) said fixed hydrofoil element having its opposed hydrofoil surface faired into the outer periphery of the cylindrical rotor and merged with lateral extremities of the wall of the recess to form a pair of fixed rearwardly extending knife edges in intimately close tangential relationship to the peripheral surface of the rotor at diametrically opposed spanwise loci therealong, and
    (e) a reversible motor drivingly connected to the cylindrical rotor.

2. Apparatus in accordance with claim 1, wherein;
    (f) said fixed hydrofoil element has a chordal section section having its zone of maximum thickness intermediate its leading and trailing edges and the diameter of the spanwise recess is equal to approximately three-quarters of said maximum thickness.

3. Apparatus in accordance with claim 2, wherein;
    (g) the opposed hydrofoil surfaces between the zone of maximum thickness to the knife edges being rearwardly tapered in accordance with a generally ogival chord section.

4. Apparatus in accordance with claim 3, wherein;
    (h) the opposed hydrofoil surfaces between the zone of maximum thickness to the leading end of the hydrofoil being forwardly tapered in accordance with a streamlined chordal section which terminates with a rounded nose.

5. Apparatus in accordance with claim 1, wherein;
    (i) the spanwise recess and the cylindrical rotor being so constructed and arranged that the gap separating their confronting surfaces is non-uniform, the non-uniform gap being equal and minimum at the lateral extremities of the wall of the recess where the knife edges confront the spanwise loci of the rotating cylinder, the non-uniform gap along the wall of the recess between the lateral extremities and including the bottom of the recess being greater than said minimum gap to reduce fluid friction between recess and rotor therealong.

References Cited

UNITED STATES PATENTS

| 1,278,750 | 9/1918 | Romualdi | 170—1.5 XR |
| 1,879,594 | 9/1932 | Trey | 244—10 |
| 2,928,626 | 3/1960 | Tino | 244—42.50 |

FOREIGN PATENTS 659,081  1/1929  France.

ANDREW H. FARRELL, *Primary Examiner.*

U.S. Cl. X.R.

170—1.5, 135.4; 244—10, 42